US007062670B1

(12) United States Patent
Larsson et al.

(10) Patent No.: US 7,062,670 B1
(45) Date of Patent: Jun. 13, 2006

(54) QUEUED MODE TRANSMISSION OF EVENT REPORTS

(75) Inventors: Jeffrey E. Larsson, Kirkland, WA (US); Meredith A. McClurg, Woodinville, WA (US); Jeffery D. Mitchell, Redmond, WA (US); Steven M. Greenberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 10/305,215

(22) Filed: Nov. 26, 2002

(51) Int. Cl.
*G06F 11/00* (2006.01)

(52) U.S. Cl. ............................. 714/4; 714/26; 714/43; 714/56; 709/223; 709/224

(58) Field of Classification Search ................ 714/4, 714/27, 43, 56; 709/223, 224, 227
See application file for complete search history.

(56) References Cited

U.S. PATENT DOCUMENTS

| 5,740,354 | A | | 4/1998 | Ben-Natan et al. | 395/183.21 |
|---|---|---|---|---|---|
| 5,790,779 | A | | 8/1998 | Ben-Natan et al. | 395/183.15 |
| 5,825,769 | A | * | 10/1998 | O'Reilly et al. | 370/360 |
| 6,338,090 | B1 | * | 1/2002 | Emmes et al. | 709/234 |
| 6,356,887 | B1 | | 3/2002 | Berenson et al. | 707/2 |
| 6,377,993 | B1 | * | 4/2002 | Brandt et al. | 709/227 |
| 6,515,968 | B1 | * | 2/2003 | Combar et al. | 370/252 |
| 6,615,258 | B1 | * | 9/2003 | Barry et al. | 709/223 |
| 6,701,514 | B1 | * | 3/2004 | Haswell et al. | 717/115 |
| 2002/0078142 | A1 | | 6/2002 | Moore et al. | 709/203 |

OTHER PUBLICATIONS

Khosh-Khui, S.A., "Electronic Error Reporting Via Internet In The VAX Environment," *OCLC Systems & Services*, 1995, vol. 11, No. 1, p. 27-38.

Kerchner, D.J., Overlapping Development: The Continuous Maintenance Phase, Sessions Presented At Northcon/85 Conference Record, Oct. 1985, p. 5/1-1-6.

Yamada, S., Osaki, S., "A Reliability model On A Software Error Detecton Process," *Transactions of the Information Processing Society of Japan*, May 1983, vol. 24, No. 3, p. 376-378.

Murthy, S., "How To Collect More Reliable Defect Reports," Nineteenth Annual Pacific Northwest Software Quality Conference, Oct. 2001, p. 279-293.

(Continued)

*Primary Examiner*—Robert Beausoliel
*Assistant Examiner*—Emerson Puente
(74) *Attorney, Agent, or Firm*—Merchant & Gould

(57) ABSTRACT

Queued mode event reporting is provided. When an event occurs within a computer, an event report is generated describing the event. If the event report cannot be immediately transmitted, it is stored in a queue for future transmission. The queue for storing the report is chosen based on whether a user should have access to the report and on whether a notification should be provided to the user when the event occurs or prior to sending the event report or at both times. A queue trigger program is also configured to execute when the computer goes online and when a user logs into the computer. The queue trigger program causes the queued reports to be sent, if possible, and causes the appropriate notifications to be shown.

21 Claims, 15 Drawing Sheets

OTHER PUBLICATIONS

U.S. Appl. No. 09/559,123, entitled "Method and Apparatus for Displaying Computer Program Errors As Hypertext," filed Apr. 26, 2000; Inventor: William R. Softky.

U.S. Appl. No. 09/570,664, entitled "Method and System for Categorizing Failures of A Program Module," filed May 15, 2000; Inventors: Kirk A. Glerum, Matthew J. Ruhlen, Eric A. LeVine, Rob M. Mensching, Charles S. Walker.

U.S. Appl. No. 09/570,621, entitled "Method and System for Handling An Unexpected Exception Generated By An Application," filed May 15, 2000; Inventors: Matthew J. Ruhlen, Michael R. Maracelais, Brian T. Hill.

U.S. Appl. No. 09/570,825, entitled "System and Method for Handling A Failure Reporting Conversation," filed May 15, 2000; Inventors: Matthew J. Ruhlen, Kirk A. Glerum.

U.S. Appl. No. 09/571,629, entitled "Method and System for Reporting A Program Failure," filed May 15, 2000; Inventors: Kirk A. Glerum, Matthew J. Ruhlen, Eric A. LeVine, E. Peter Oosterhof.

U.S. Appl. No. 09/596,591, entitled "Method and System for Cyclic Crash Prevention During Application Startup," filed Jun. 19, 2000; Inventors: Michael R. Maracelais, Brian T. Hill, Eric A. LeVine, Steven Miles Greenberg.

U.S. Appl. No. 09/588,165, entitled "Method and System for Recovering Information During A Program Failure," filed Jun. 5, 2000; Inventors: Kevin Joseph Fischer, Eric A. LeVine, Brian T. Hill, Michael R. Marcaelais, Jeffrey Larsson.

U.S. Appl. No. 09/602,284, entitled "Method and System for Reporting Failures of a Program Module In a Corporate Environment," filed Jun. 23, 2000; Inventors: Kirk A. Glerum, Matthew J. Ruhlen.

U.S. Appl. No. 09/602,457, entitled "Method and System for Repairing Corrupt Files and Recovering Data," filed Jun. 23, 2000; Inventors: Kevin Fisher, Robert Coffen, Eric Snyder, Jeff Larsson.

* cited by examiner

QUEUED MODE TRANSMISSION OF EVENT REPORTS

TECHNICAL FIELD

Embodiments of the invention relate generally to the field of reporting the occurrence of events within a computer system and, more particularly, to the queuing and storage of event reports until a time at which they may be transmitted.

BACKGROUND OF THE INVENTION

One of the most important stages in the software development cycle is the debugging stage that occurs after a software product has shipped. This stage is important because the experiences of millions of users of the software product may be utilized during this stage to isolate program errors, identify frequently or infrequently used features, and to generally make the software product better. In order to capitalize on the body of user experience with the software product, however, it is necessary to obtain data from users and to route this data to the software developer.

Prior to the widespread adoption and use of the Internet, it was very difficult for software developers to obtain quality data regarding how a software product performed for a large number of users. Now, however, the Internet connects millions of users with the developers that create and debug the software they use. The Internet, therefore, allows data regarding the operation of a software product to be sent from a computer user to the developer of the product. The data may then be utilized by the developer to fix errors, also called "bugs," in the program, to change the way the program operates by adding or removing features, and to otherwise improve the program. However, current systems for transmitting this data from a user to a software developer suffers from several drawbacks that reduce their effectiveness.

Current systems for reporting data regarding the operation of a software product generate event reports in response to the occurrence of an event within executing program code. For instance, an event report may be generated when an error occurs in the program code, when an unhandled exception is generated by the program code, when a particular line of code is encountered, or under other circumstances. Data that may assist the developer in understanding the event and in modifying the program code to ensure that it does not occur again is typically included in the event report. For instance, data describing the state of the computer when the event occurred may be included along with other data in the event report.

Once the event report has been created, an attempt is made to send the report to the developer via the Internet. If the user's computer has an online connection to the Internet, the report may be sent immediately. However, if the user's computer is not connected to the Internet at the time the transmission attempt is made, current systems are unable to transmit the report. For instance, if a laptop user does not have access to a network when an event occurs, current systems are unable to transmit an event report describing the event. The event report is typically lost and the data contained in the event report cannot be used in the further development and debugging of the software product.

Another limitation of current systems for reporting on the operation of a software product stems from the fact that these systems bother the computer user with user interface dialog boxes every time an event occurs, when the event occurs. This works well for software crashes where the seriousness of the problem requires that the user be interrupted. However, this can be distracting for the user when the seriousness of the problem does not warrant bothering the user. An example of this is when a particular line of code has been flagged by a developer to generate an event report (commonly referred to as a "ship assert"). Encountering the line of code is meaningful to the developer but meaningless to the user. Therefore, bothering the user when such an event occurs creates a less than ideal user experience.

It is with respect to these considerations and others that the present invention has been made.

SUMMARY OF THE INVENTION

In accordance with the present invention, the above and other problems are solved by a method and apparatus for event reporting that can queue event reports until such time as the event reports may be successfully transmitted to an error reporting server computer. Moreover, the above and other problems are solved by a method and apparatus for event reporting that can selectively provide notifications to a user when an event has occurred and when an event is to be reported. In this manner, a user may be selectively notified when a serious event occurs but not when a less-serious event occurs. Likewise, a user may be notified prior to the transmission of event reports containing privacy intrusive information but not notified prior to the transmission of event reports containing only privacy benign information.

In accordance with other aspects, the present invention relates to a method for reporting the occurrence of an event within a computer. The event may be a program crash, an unhandled exception, the execution of a particular line of program code, or other type of event concerning the operation of the computer or software executing on the computer. When an event occurs, data relating to the event is captured and utilized to create an event report. The event report contains data describing the event that may be utilized to debug the event, such as a program or memory dump.

Once an event report has been generated, a determination is made regarding whether the event may be reported. In particular, a determination is made as to whether an active Internet connection is available to the computer for transmission of the event report. Alternatively, a determination may be made as to whether a directory is accessible on a corporate error reporting ("CER") file server for storing the event report. If the event can be immediately reported, it is transmitted to an error reporting server computer or to the CER file server. If the event cannot be immediately reported, the error report is queued for later reporting.

One of several queues may be chosen for temporarily storing the event report. The appropriate queue for storing the event report is selected based on when, and if, a notification should be provided to a user of the computer when the event occurs or when the event is reported, or at both times. In particular, a user's "regular queue" is utilized when a user should be notified both when the event occurs and just prior to reporting the event to the error reporting server or CER file server. A user's "signoff queue" is utilized when a user is not to be notified when the event occurs, but is to be notified prior to reporting the event. A user's "headless queue" is utilized when a user is not to be notified when the event occurs or prior to reporting the event.

One of several administrator queues may also be utilized for storing an event report. These queues may be utilized when it is difficult to determine which user "owns" the event report. This may occur, for instance, when an error report is generated and no user is logged into the computer or when the security context of the error report does not match the security context of the user. In particular, an administrator's "signoff queue" may be utilized when an administrator user should receive a notification prior to reporting an event, but not when the event occurs. An administrator's "headless queue" may be utilized when an administrator user should not be notified either when the event occurs or prior to reporting the event.

When an event report is queued, the computer is configured to execute a queue reporting trigger program in response to the occurrence of any one of several events. In particular, the queue reporting trigger program may be executed in response to an active connection to a distributed computing network, such as the Internet, becoming available to the computer. The queue reporting trigger program may also be executed when an administrator user or a user for which a report has been generated logs into the computer. Alternatively, the queue reporting trigger program may be executed in response to an explicit call.

The queue reporting trigger program, when executed, identifies each of the queues that contain error reports and selects one of the queues containing reports to report from. The reports in the selected queue are then transmitted to a CER file server or an error reporting file server. If the selected queue is either a regular queue or a signoff queue, a notification is provided to the user prior to transmission of the report and the user is given the opportunity to postpone or cancel transmission of the reports in the selected queue. Additionally, a pester throttle is checked prior to providing any notification to the user to ensure that the user has not been bothered with event report-related notifications too recently. Once the error reports have been transmitted, cancelled, or postponed, the computer is configured to prevent further execution of the queue trigger program until a subsequent report is queued.

In accordance with still other aspects, the present invention relates to a computer-readable medium, computer-controlled apparatus, and system for queued mode event reporting. These and various other features as well as advantages, which characterize the present invention, will be apparent from a reading of the following detailed description and a review of the associated drawings.

DETAILED DESCRIPTION OF THE INVENTION

Figure 1:
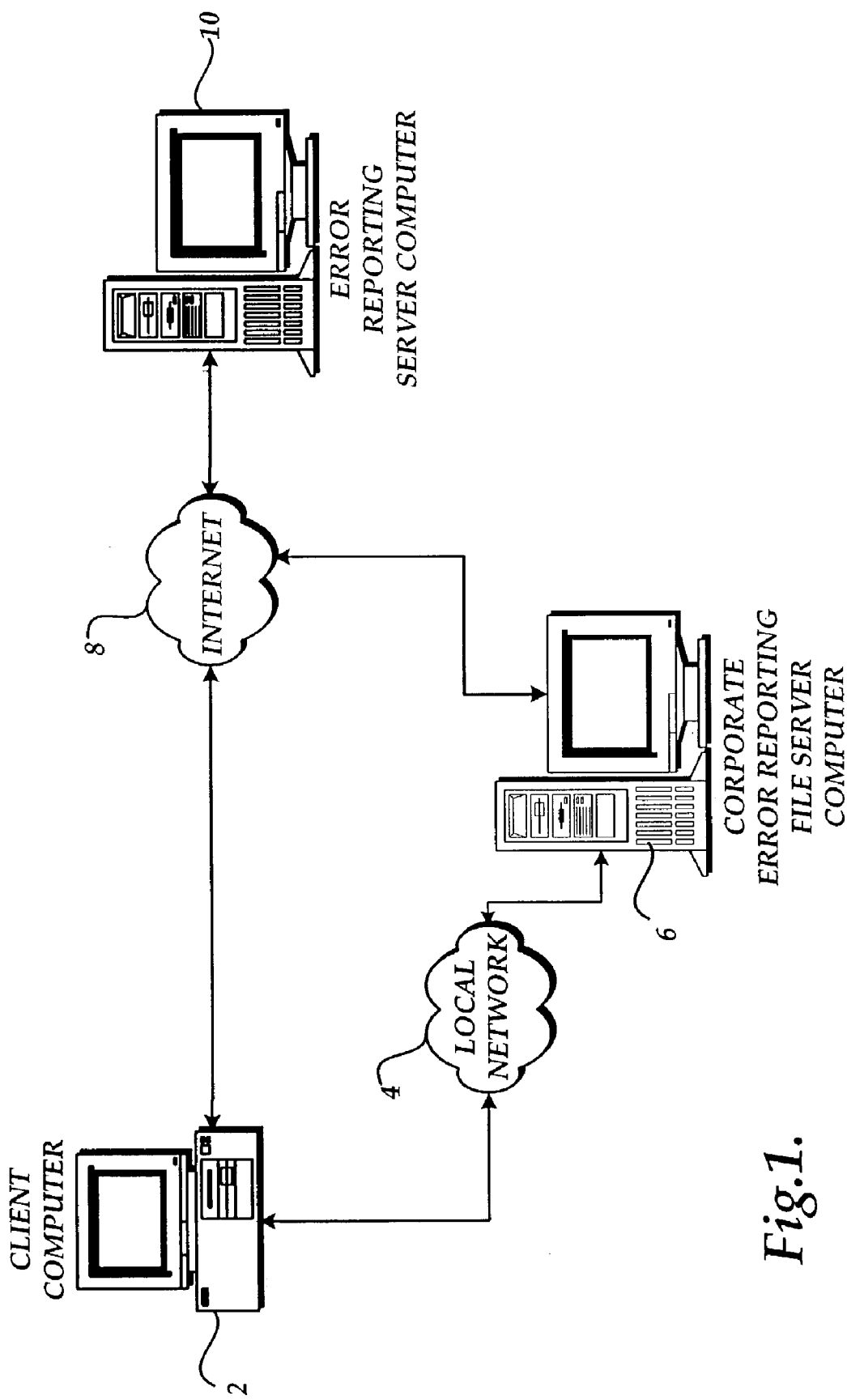
FIG. 1 is a network diagram showing an illustrative operating environment for various embodiments of the invention.

Referring now to the drawings, in which like numerals represent like elements through the several figures, aspects of the present invention and the exemplary operating environment will be described. In particular, FIG. 1 shows an illustrative operating environment for various embodiments of the present invention. As shown in FIG. 1, a client computer 2 is utilized in the various embodiments of the invention. The client computer comprises a standard desktop or server computer that may be used to execute one or more program modules. The client computer 2 is also equipped with program modules for generating error reports in response to events occurring within the client computer 2. Event reports may be generated in response to unhandled exceptions, software program errors, and other types of events.

As will be described in greater detailed below, the client computer 2 is also operative to transmit the error reports to a corporate error reporting ("CER") file server computer 6 available through a local area network ("LAN") 4. The CER file server computer 6 comprises a server computer maintained and accessible through the LAN 4 to the client computer 2. The CER file server computer 6 receives error reports from the client computer 2, stores the reports, and may subsequently forward the error reports to the error reporting server computer 10. A policy may be set at the client computer 2 instructing the client computer 2 to transmit error reports to the CER file server computer 6.

A policy also may be set at the client computer 2 instructing the client computer 2 to transmit error reports through the Internet 8, or other type of distributed computing network, to the error reporting server computer 10. The error reporting server computer 10 comprises a server computer maintained typically by a developer of the software application or other type of program for receiving error reports. The error reports may assist the developer in correcting errors occurring within software components executing on the client computer 2.

As will also be described in greater detail below, the client computer 2 is operative to queue error reports prior to transmission to either the CER file server computer 6 or the error reporting server computer 10. Error reports may be queued when the client computer 2 is offline and not connected to either the LAN 4 or the Internet 8. When the client computer 2 subsequently connects to either of these networks, the error reports may then be transmitted to the appropriate server computer. In this manner, if the client computer 2 is offline when an error report is generated, the error report will be queued until such time as it can be safely transmitted. For instance, this may be useful for a laptop or other type of portable computing device that is frequently used away from a permanent network connection. Additional details regarding the generation, queuing, and dequeueing of error reports by the client computer 2 will be provided below with respect to FIGS. 2–11B.

Figure 2:
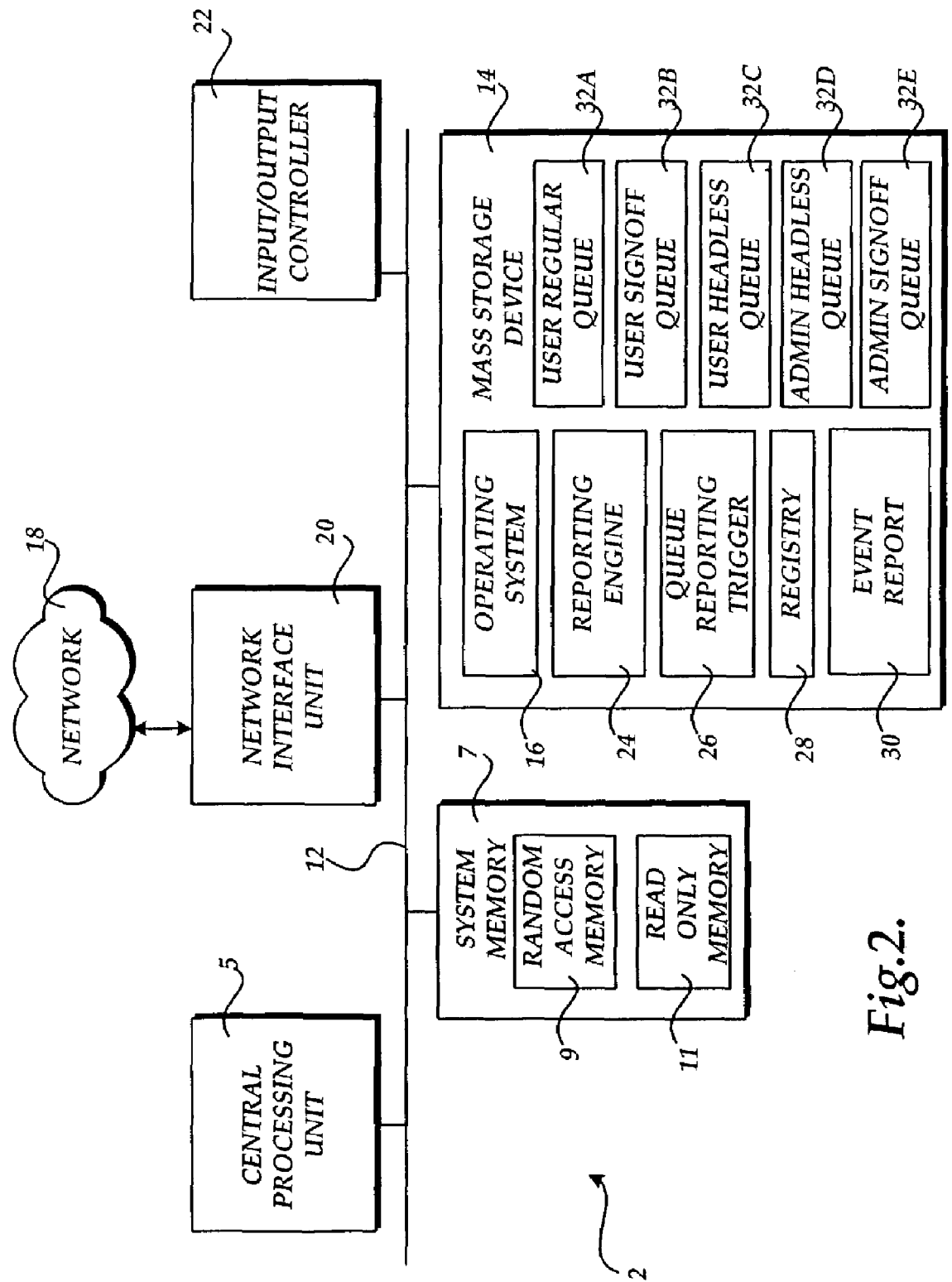
FIG. 2 is a computer architecture diagram showing a computer architecture for a client computer provided by various embodiments of the invention.

FIG. 2 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 2, an illustrative computer architecture for a client computer 2 for practicing the various embodiments of the invention will be described. The computer architecture shown in FIG. 2 illustrates a conventional desktop or server computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and program modules for reporting events occurring within the client computer 2.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the client computer 2 may operate in a networked environment using logical connections to remote computers through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a reporting engine program module 24. The reporting engine 24 contains functionality for generating error reports, queuing the error reports, and transmitting the error reports to either CER file server 6 or the error reporting server computer 10. The reporting engine 24 may be utilized to perform these functions in response to an error event occurring within the operating system 16 or within an application program. Moreover, the reporting engine 24 may be utilized to perform these functions in response to other types of events such as an unhandled exception, a program alert, or upon encountering an assert condition. Moreover, the reporting engine 25 may be explicitly called by other program modules to perform some of its functions, such as dequeueing stored error reports.

The mass storage device 14 and RAM 9 may also include a reporting trigger program module 26. As will be described in greater detail below, the reporting trigger 26 comprises a program module that is executed in response to the occurrence of certain types of events within the client computer 2. In response to these events, the reporting trigger 26 determines whether queued event reports should be dequeued. As used herein, dequeueing refers to the process of transmitting one or more event reports from the client computer 2 to either the CER file server computer 6 or the error reporting server computer 10.

The mass storage device 14 and RAM 9 may also store one or more event reports 30. The event report 30 comprises a collection of one or more parameters or files describing occurrence of an event within the client computer 2. As mentioned above, the event may comprise a software event, a hardware event, or other type of event. The event report 30 includes data describing the particulars of the event, such as the application name in which the event occurred, the application version, the software module name in which the event occurred, the module version, an offset, a program dump, a stack dump, or other information describing the state of the client computer 2 when the event occurred. It should be appreciated that this list of data types is provided only to illustrate the types of data that may be included within an event report 30 and that any type of data describing the occurrence of an event within a computer may be provided.

According to the various embodiments of the invention, the mass storage device 14 and RAM 9 may also store a registry 28. As known to those skilled in the art, the registry 28 comprises a non-volatile area for storing program variables and other values relating to the operation of the operating system 16 or application programs executing within the client computer 2. The mass storage device 14 and RAM 9 may also store one or more queues 32A–32E. The queues 32A–32E are utilized to store event reports 30 until such time as they may be dequeued.

According to one embodiment of the invention, the queues 32A–32E comprise directories stored on the mass storage device 14. Event reports 30 and other information relating to the event reports may be copied to the queues 32A–32E by copying files into these directories. Moreover, according to the various embodiments of the invention, the particular queue into which an event report 30 is stored defines when, and if, a user of the client computer 2 will be provided a notification regarding the queuing or dequeueing of the event report 30. In particular, the user regular queue 32A is utilized when a user should be notified both when the event occurs and the event report is queued, and again just prior to dequeueing, or reporting, the event. The user signoff queue 32B is utilized when a user is not to be notified when the event occurs and the report is queued, but is to be notified prior to dequeuing the event report. The user headless queue 32C is utilized when a user is not to be notified when the event report is queued or when the event report is dequeued.

According to one embodiment of the invention, an administrative headless queue 32D and an administrator signoff queue 32E may also be utilized. The queues 32D and 32E may be utilized when a non-administrator user should not have access to the event report 30. The need for the administrator queues arises from the fact that an error report may be generated by a server computer when no user is logged on. The administrator queues may also be useful when the security context of the logged on user does not match the security context of the error report and therefore the user should not have access to the report. In particular, the administrator headless queue 32D may be utilized when an administrator user should not be notified either when an event report is queued or prior to dequeueing the event. This queue may be utilized, for instance, on a server computer that is configured to queue and dequeue event reports without user interaction. The administrator signoff queue 32E may be utilized when an administrator user should receive a notification prior to dequeueing an event report, but not when the event report is queued. In this manner, the administrator user may approve of the transmission of the event reports. Additional details regarding the use of each of the queues 32A–32E will be provided in greater detail below.

Figure 3:
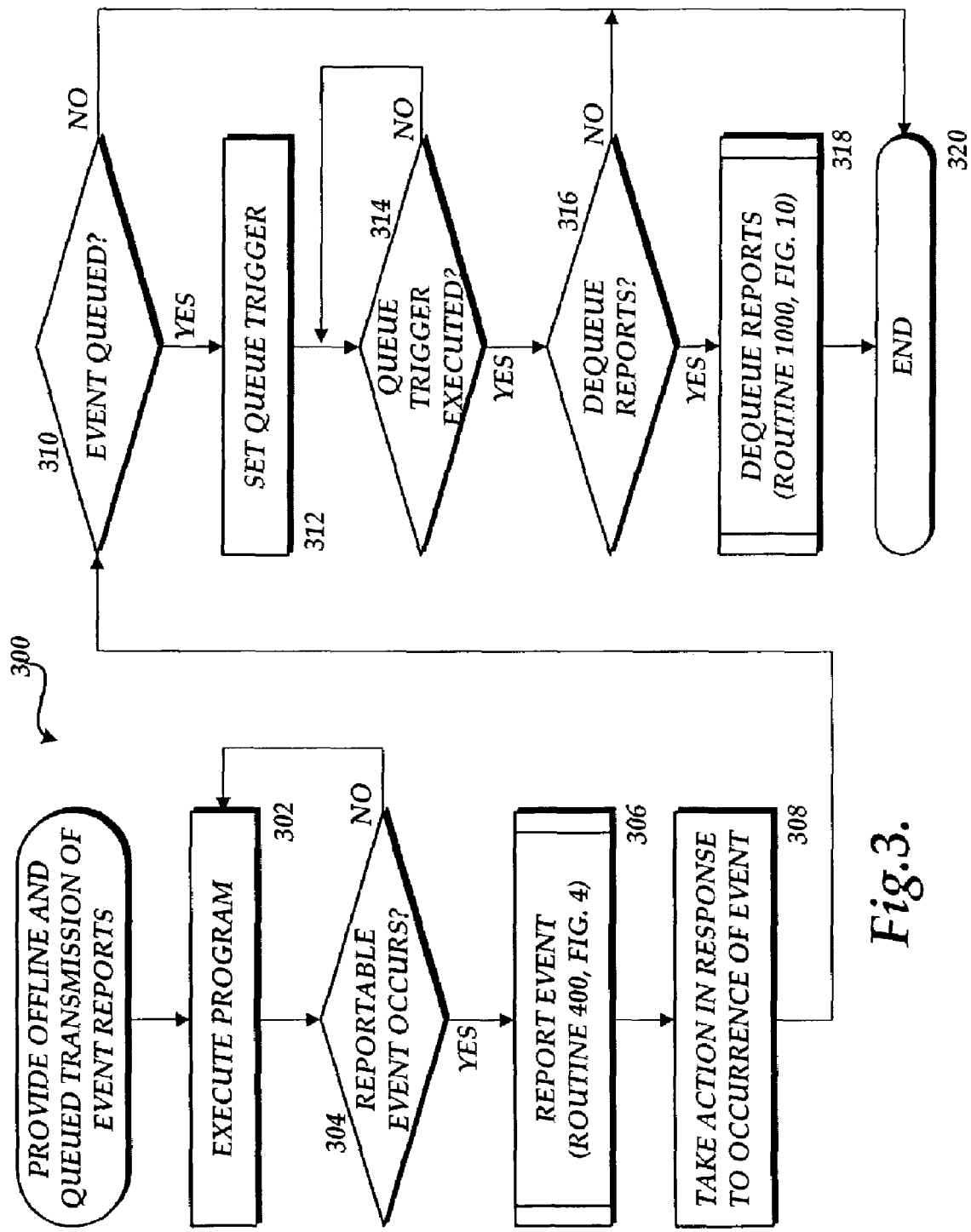
FIG. 3 is a flow diagram showing an illustrative routine for providing queued transmission of event reports according to one embodiment of the invention.

Referring now to FIG. 3, an illustrative routine 300 will be described illustrating the queued transmission of event reports according to one embodiment of the invention. The routine 300 begins at block 302, where a computer program is executed on the client computer 2. The program may comprise the operating system 16 or other type of program module, including application programs. From block 302, the routine 300 continues to block 304 where a determination is made as to whether a reportable event has occurred. As mentioned briefly above, any type of even occurring within the client computer 2 may be reported. For instance, unhandled exceptions, setup errors, other types of program errors, asserts, and other types of events may be reported. If a reportable event has not occurred, the routine branches back to block 302, where the program continues to execute. If, however, a reportable event has occurred, the routine 300 continues to block 306.

At block 306, an attempt is made to report the event. In particular, an event report 30 is generated that describes the event. An attempt is then made to immediately transmit the event report to either a CER file server 6 or an error reporting server computer 10. If the event report cannot be transmitted immediately, or if the client computer 2 is configured to force event reports to a queue, the event report may then be queued for transmission at a subsequent time. For instance, if the client computer 2 is not connected to a distributed computing network or a LAN 4, the event report will be queued. Moreover, if the file system on the CER file server computer 6 is inaccessible to the client computer 2, the event report may also be queued. Additional details regarding the reporting of an event occurring within the client computer 2 will be provided below with respect to FIG. 4.

Once an event report has been generated and either transmitted or queued, the routine 300 continues to block 308. At block 308, some action is taken in response to the occurrence of the event. In particular, the program in which the event occurred may be terminated, data utilized by the program may be saved, or other types of actions may be taken. Alternatively, no action may be taken and the program module in which the event occurred may be permitted to continue its execution. It should be appreciated that the action taken at block 308 is performed asynchronously with the reporting of the event. From block 308, the routine 300 continues to block 310.

At block 310, a determination is made as to whether an event report has been queued. If no event reports have been queued, the routine 300 branches to block 320, where it ends. However, if event reports have been queued, the routine 300 continues to block 312 where the queue reporting trigger 26 is set for execution. In particular, the queue reporting trigger 26 is configured to execute when either a connection to the Internet 8 or the LAN 4 becomes available to the client computer 2. In addition, the queue reporting trigger 26 is set to execute when a user logs into the client computer 2. As will be discussed in greater detail below, the queue reporting trigger 26 determines whether one of the queues 32A–32E may be reported from, and makes an appropriate call to the reporting engine 24 to dequeue reports if possible.

From block 312, the routine 300 continues to block 314. At block 314 a determination is made as to whether the queue reporting trigger 26 has been executed in response to the conditions described above. If the queue reporting trigger 26 has not been executed, the routine 300 branches back to 314 where another determination is made. If, however, the queue reporting trigger 26 is executed, the routine 300 continues to block 316. At block 316, a determination is made as to whether reports contained in one of the queues 32A–32E may be dequeued. For instance, a determination may be made as to whether an Internet 8 or LAN 4 connection is available to the client computer 2 for transmission of an event report. If the reports may not be dequeued, the routine 300 branches to block 320, where it ends. If, however, at block 316, it is determined that the reports may be dequeued, the routine 300 continues to block 318.

At block 318, reports contained in one of the queues 32A–32E are dequeued. In particular, this process may involve selecting one of the queues 32A–32E to report from, transmitting each of the reports in the selected queues to either the CER file server computer 6 or the error reporting server computer 10. Additionally, this process may include configuring the reporting trigger 26 so that it will not execute again until a subsequent error report is queued. Additional details regarding the process of dequeueing event reports will be provided below with respect to FIGS. 10A–10C. From block 318, the routine 300 continues to block 320, where it ends.

Figure 4:
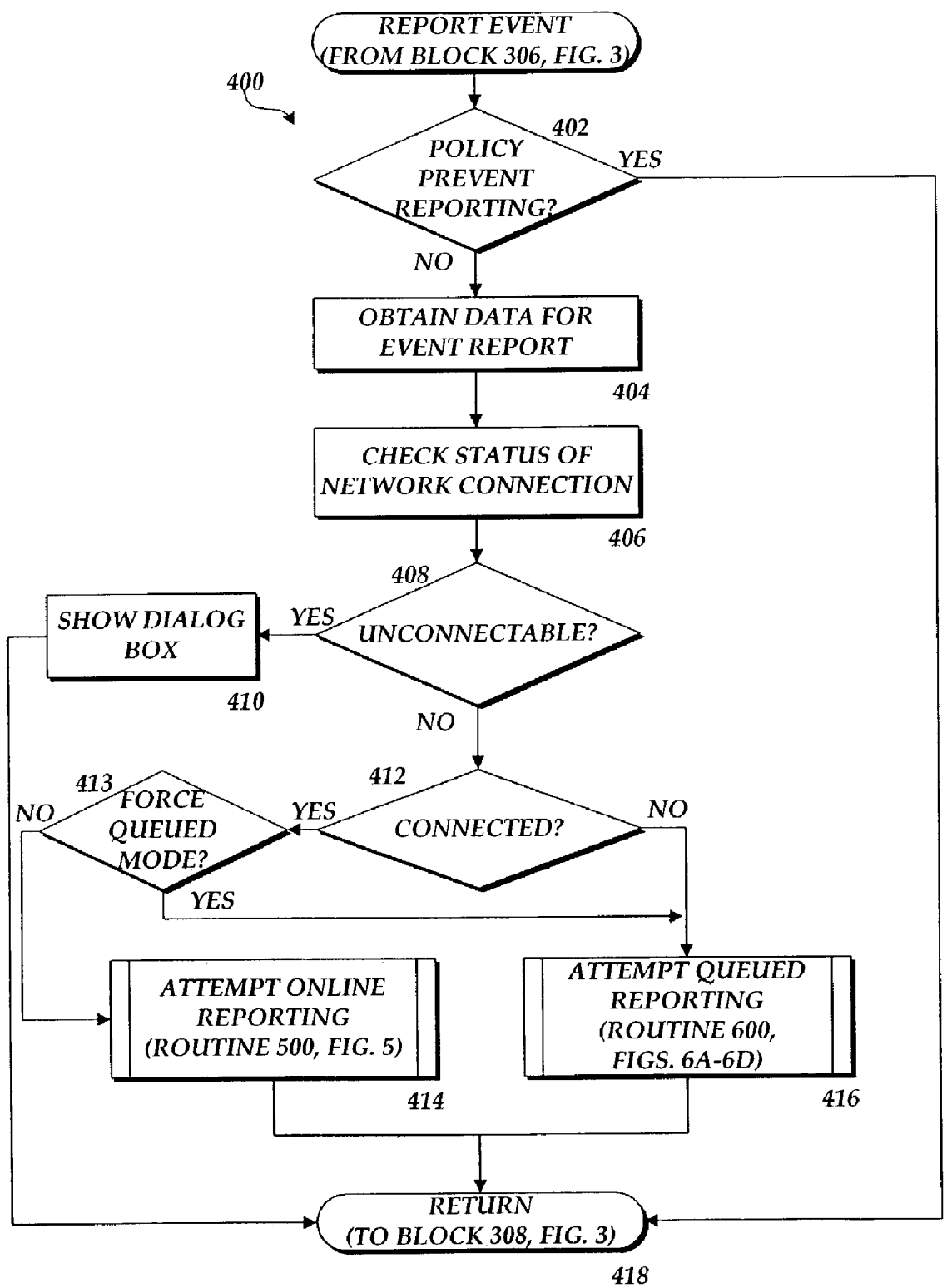
FIG. 4 is a flow diagram showing an illustrative routine for reporting the occurrence of an event provided in one embodiment of the invention.

Referring now to FIG. 4, additional details regarding the reporting of an event occurring within the client computer 2 will be described with reference to the routine 400. In particular, the routine 400 begins at block 402 where a determination is made as to whether a policy prevents reporting of the event. According to one embodiment of the invention, a user of the client computer 2 may be able to specify whether they would like to participate in event reporting. Alternatively, an administrator of the client computer 2 may also specify whether events generated at the client computer 2 should be reported. The policy decision regarding whether or not events should be reported may be identified and stored within the registry 28.

If, at block 402, it is determined that a policy prevents reporting, the routine 400 branches to block 418, where it returns. If, however, it is determined at block 402 that a policy does not prevent reporting, the routine 400 continues to block 404. At block 404, the data necessary to create the event report 30 is obtained. This may entail identifying the program module in which the event occurred, retrieving the contents of memory, or obtaining other information regarding the state of the client computer 2 at the time the event occurred.

From block 404, the routine 400 continues to block 406, where a check is made of the status of any network connection to the client computer 2. In particular, a determination is made as to whether the client computer 2 is unconnectable to a network, connectable to a network but not currently connected, or currently connected to a network. In the MICROSOFT WINDOWS operating system, this determination may be made by calling the routine INTERNET-GETCONNECTEDSTATE( ).

Once the determination regarding the status of the network connection to the client computer 2 is made, the routine 400 continues from block 406 to block 408. At block 408, a determination is made as to whether the client computer 2 is unconnectable to a network. The client computer 2 may be unconnectable to a network, for instance, if it does not contain the necessary hardware to connect the client computer 2 to a network. If the client computer 2 is unconnectable, the routine 400 branches to block 410, where a user interface dialog box may be displayed to the user indicating that an event has occurred on the client computer 2. For some types of events, a dialog box would not be displayed. Because the computer 2 is unconnectable, the user is not provided an opportunity to report the event. From block 410, the routine 400 continues to block 418, where it returns.

If, at block 408, it is determined that the client computer 2 is connectable to a network, the routine 400 continues to block 412. At block 412, a determination is made as to whether the client computer 2 is currently connected to a network. If the client computer 2 is connected, the routine 400 branches to block 413, where a determination is made as to whether queued mode reporting has been forced by setting a flag. If queued mode reporting has been forced, the routine 400 branches to block 416. If queued mode is not forced, the routine 400 continues to block 414 where an attempt is made to immediately transmit the event report to either the CER file server 6 or the error reporting server computer 10. Additional details regarding immediate online transmission of an event report is described below with reference to FIG. 5.

If it is determined at block 412 that the client computer is not connected to a network, the routine 400 branches to block 416. At block 416, an attempt is made to queue the event report for subsequent transmission. Additional details regarding queued mode reporting is provided below with reference to FIG. 6. From blocks 414 and 416, the routine 400 continues to block 418 where it returns to block 308, described above with reference to FIG. 3.

Figure 5:
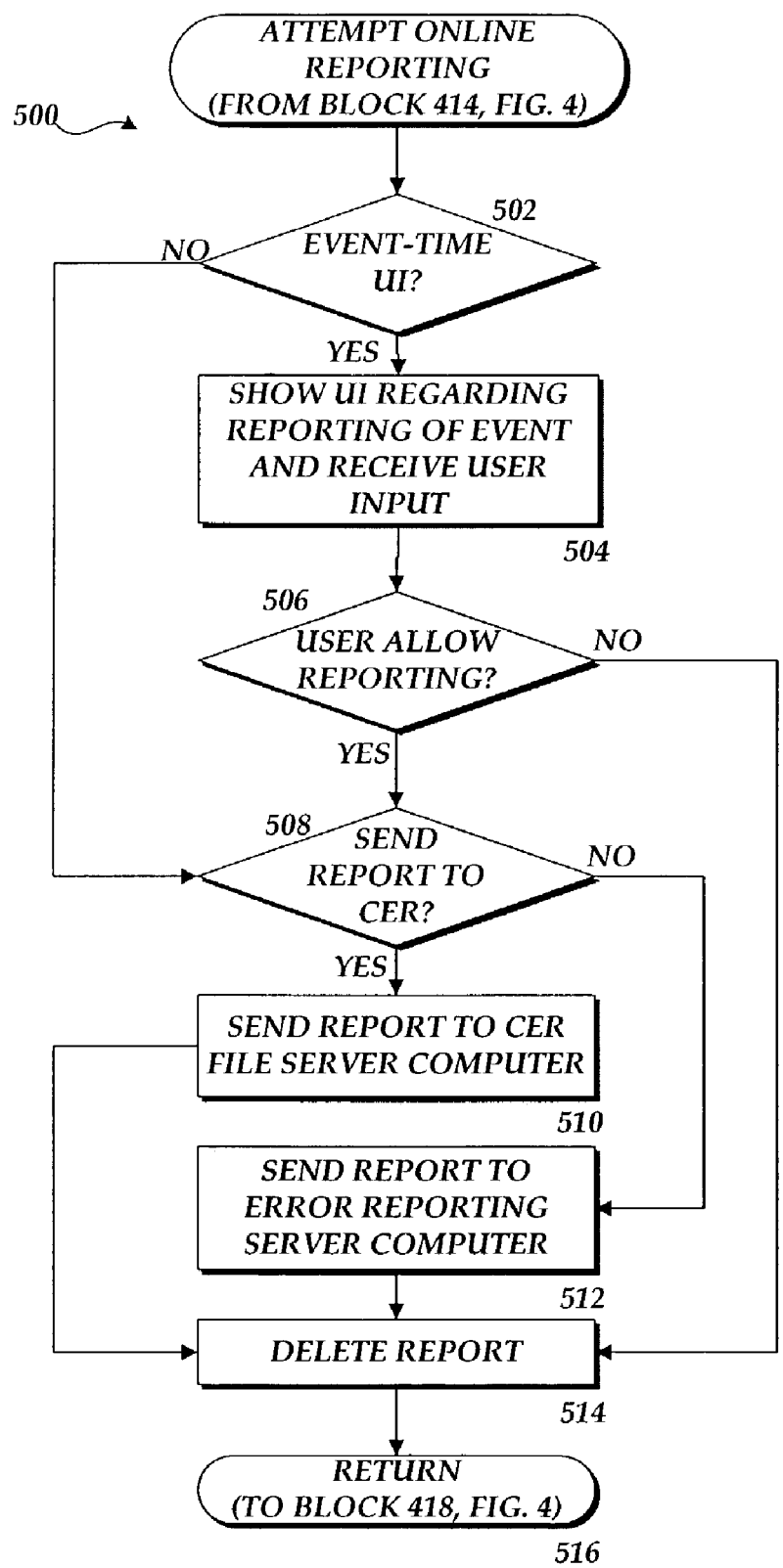
FIG. 5 is a flow diagram showing an illustrative routine for online reporting in one embodiment of the invention.

Referring now to FIG. 5, the routine 500 will be described illustrating additional aspects for attempting online reporting of events. The routine 500 begins at block 502, where a determination is made as to whether any user interface notification should be presented to a user of the client computer 2 at the time the event occurs. If no user interface is to be shown to a user of the client computer 2, the routine 500 branches from block 502 to block 508. If, however, user interface notification is to be provided to a user of the client computer 2, the routine 500 continues from block 502 to block 504.

At block 504, a user interface dialog box is presented on the client computer 2 indicating that an error has occurred, that an event report will be transmitted, and requesting permission to transmit the event report. The routine 500 then continues to block 506 where a determination is made as to whether the user has indicated that reporting of the event report is allowed. If reporting is not allowed, the routine branches to block 514. If, however, the user has indicated that it is permissible to transmit the event report, the routine 500 continues to block 508.

At block 508, a determination is made as to whether the error report should be transmitted directly to the CER file server computer 6. This determination may be made by consulting an entry in the registry 28 or another location identifying the destination for the event report. If the event report is not to be transmitted to the CER file server 6, the routine branches from block 508 to block 512. At block 512, the error report is transmitted from the client computer 2 to the error reporting server computer 10. The routine then continues from block 512 to block 514, where the error report is deleted.

If, at block 508, it is determined that the error report should be transmitted to the CER file server 6, the routine 500 continues to block 510. At block 510, the error report is transmitted to the CER file server computer 6. The error report is then deleted at block 514. From block 514, the routine 500 continues to block 516 where it returns to block 418, described above with reference to FIG. 4.

Figure 6A:
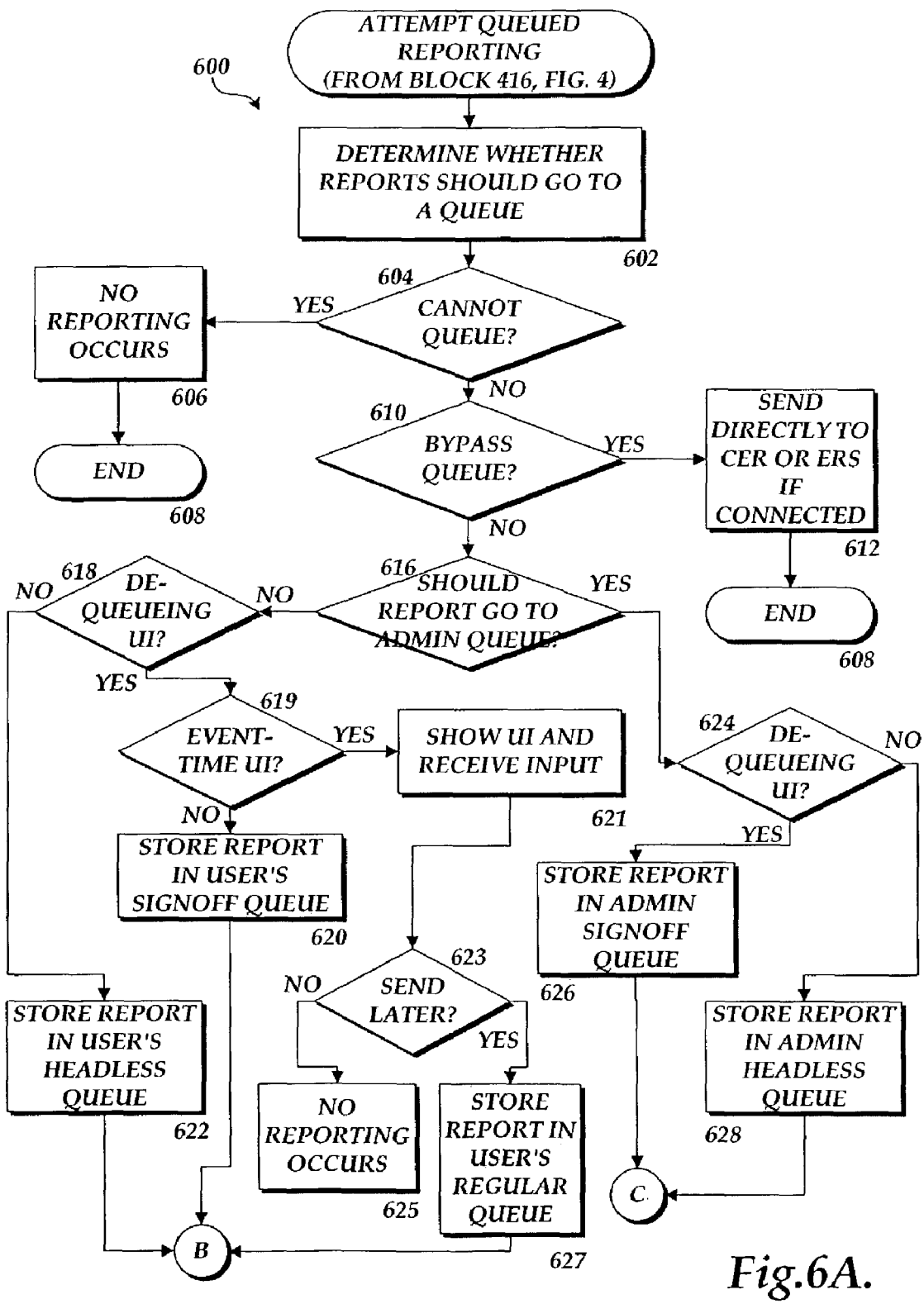
FIGS. 6A–6C are flow diagrams showing an illustrative routine for queued mode reporting in one embodiment of the invention.
Figure 6B:
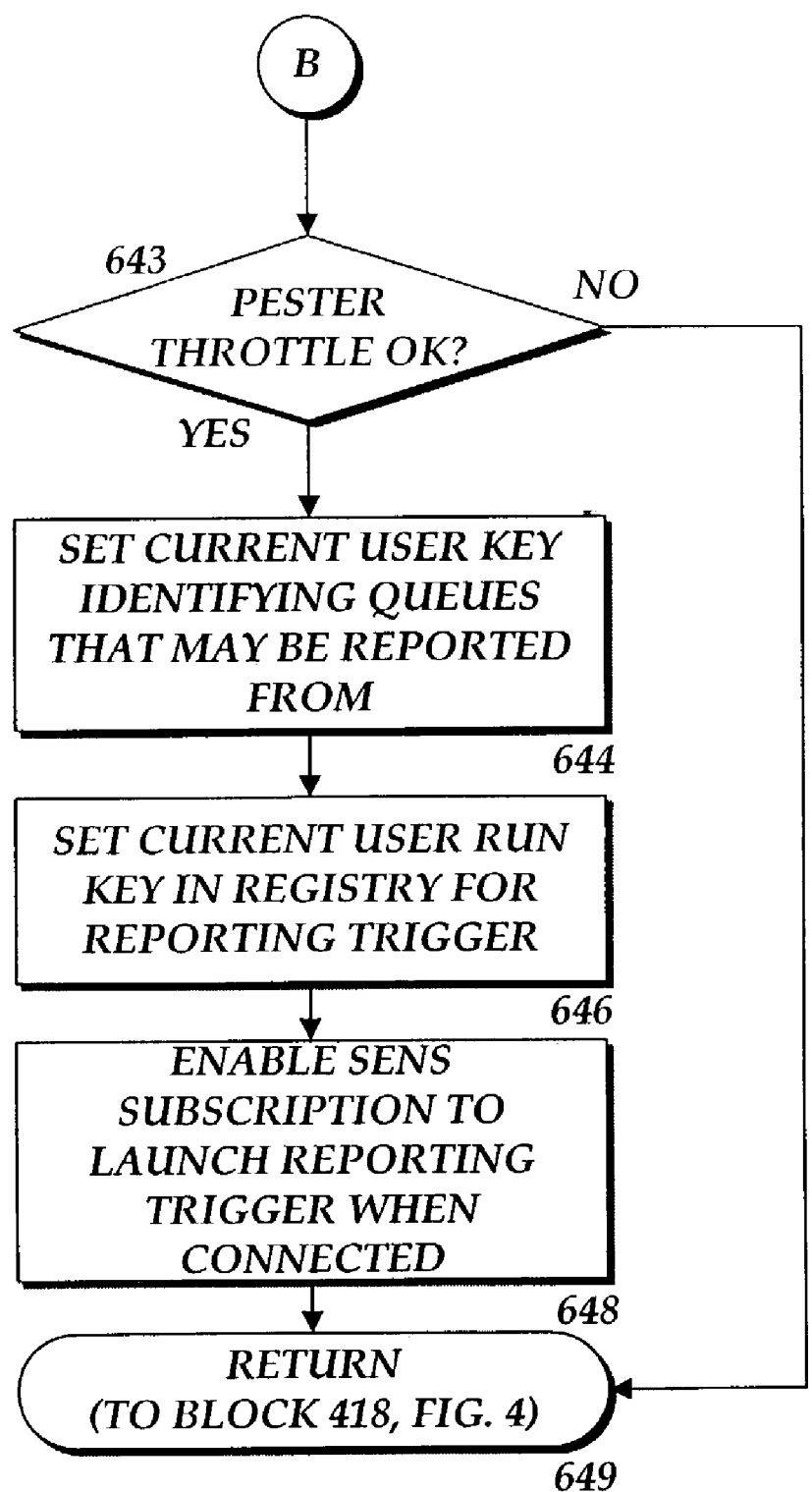
Figure 6C:
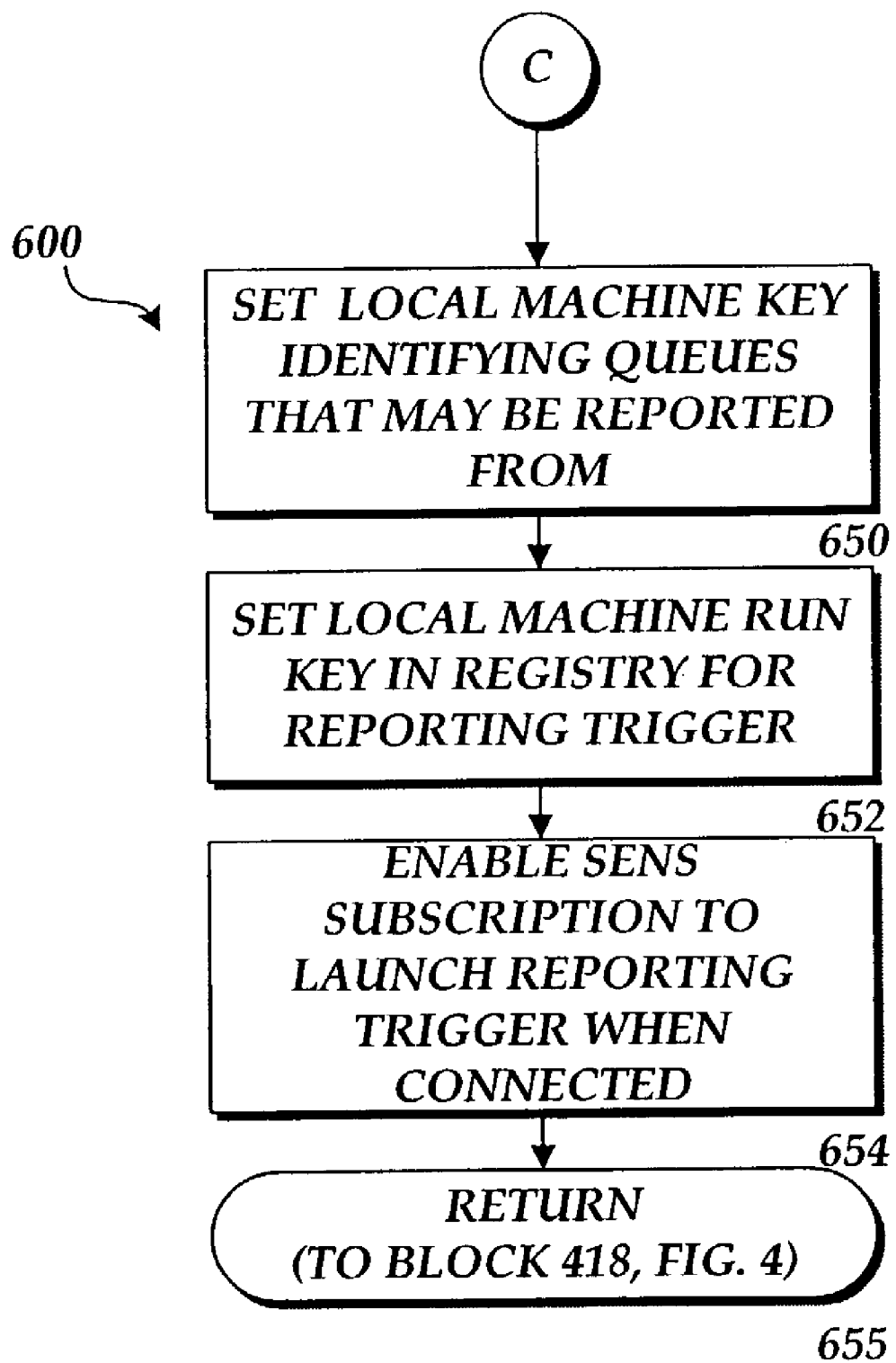

Referring now to FIGS. 6A–6C, an illustrative routine 600 will be described that illustrates aspects of queued mode reporting according to various embodiments of the invention. The routine 600 begins at block 602, where a determination is made as to whether event reports should be stored in a queue prior to transmission. In particular, a determination is made as to whether the client computer 2 can queue, cannot queue, must queue, or must bypass the queuing of event reports.

From block 602, the routine 600 continues to block 604, where a determination is made as to whether the client computer 2 cannot queue event reports. If the client computer 2 cannot queue event reports, the routine 600 branches to block 606, where no further action is taken with respect to the event report. A user interface dialog box may be presented to the user even though the report is not sent. The routine 600 then continues from block 606 to block 608, where it ends. If, however, it is determined at block 604, that the client computer 2 can queue, the routine 600 continues to block 610.

At block 610, a determination is made as to whether the queue must be bypassed. If the queue must be bypassed, the routine 600 branches to block 612 where the error report is transmitted directly to the CER file server 6 or the error reporting server 10. The error report will be transmitted in this manner only if the client computer 2 is connected to the LAN 4 or the Internet 8. The routine 600 then continues from block 612 to block 608, where it ends.

If, at block 610, it is determined that the queue should not be bypassed, the routine 600 continues from block 610 to block 616.

At block 616, a determination is made as to whether the event report should be stored in an administrator queue. As described briefly above, an administrator queue may be utilized when no user has logged onto the computer 2 when the event report is generated or when the security context of the event report does not match the security context of the currently logged in user. If the event report should not be stored in an administrator queue, the routine 600 branches from block 616 to block 618.

At block 618, a determination is made as to whether the user interface notification should be provided to a user of the computer 2 when the event report is dequeued. As will be described in greater detail below with reference to FIGURES 11A–11B, the user interface dialog box may be provided to a user indicating that an event report may be transmitted and requesting permission from the user to transmit the event report. If such a user interface is not to be provided to the user when the report is transmitted, the routine 600 branches from block 618 to block 622, where the report is stored in the user's headless queue. If, however, a user interface notification is to be provided to the user when the report is transmitted, the routine 600 branches from block 618 to block 619.

At block 619, a determination is made as to whether a user interface notification should be provided to the user at the time the event occurs and the event report is generated. If no notification is to be provided to the user at the time the event occurs, the routine 600 continues from block 619 to block 620, where the report is stored in the user's signoff queue.

If, however, at block 619, it is determined that a notification should be provided to the user at the time the event occurs, the routine 600 branches from block 619 to block 612. At block 612, a user interface notification is provided to the user asking the user whether the event report should be queued for transmission at a later time. The routine 600 then continues from block 621 to block 623 where a determination is made as to whether the user indicated that the report should be queued for transmission at a later time. If the user indicated that the report should not be queued for transmission at a later time, the routine 600 branches from block 623 to block 625, where no reporting will take place. If, however, at block 623, it is determined that the user indicated that the report should be transmitted at a later time, the routine 600 branches from block 623 to block 627. At block 627, the event report is stored in the user's regular queue.

From blocks 620, 622, and 627, the routine 600 continues to block 643. At block 643, a determination is made as to whether an event report has recently been transmitted. This determination is made by checking a pester throttle to determine if an event report has been transmitted within a predetermined period of time. If a report has been sent within the period of time, the pester throttle prevents reporting and the routine 600 branches from block 643 to block 649. If not, the routine 600 continues from block 643 to block 644. At block 644, a current user key is stored in the registry 28 identifying the queues that may be reported from. As known to those skilled in the art, a current user key is a key stored in the registry 28 that is accessible and applicable to the current user of the client computer 2. The current user key identifying the queues that may be reported from identifies each of the queues 32A–32E that contain untransmitted event reports.

From block 644, the routine 600 continues to block 646, where a current user run key is stored in the registry 28 for executing the queue reporting trigger program 26. As known to those skilled in the art, a run key causes an identified program to be executed concurrently with the login to the client computer 2 of the current user. Accordingly, the current user run key causes the queue reporting trigger program 26 to be executed each time the current user logs into the client computer 2.

From block 646, the routine 600 continues to block 648, where a system event notification service ("SENS") is configured for launching the queue reporting trigger 26 when the client computer 2 becomes connected to a network. As known to those skilled in the art, a SENS subscription can monitor the state of the client computer 2 and take a certain action when a particular aspect of the computer's state changes. In this manner, the queue reporting trigger program 26 may be executed when the client computer 2 connects to a network. Additional details regarding the execution of the queue reporting trigger 26 and the functionality it provides will be described in greater detail below. From block 648, the routine 600 continues to block 649, where it returns to block 418, described above with reference to FIG. 4.

If, at block 616, it is determined that the event report should be stored in an administrator queue, the routine 600 branches from block 616 to block 624. At block 624, a determination is made as to whether a user interface notification should be provided to the user when the event report is dequeued. If a notification should be provided to the user, the routine 600 branches from block 624 to block 626, where the event report is stored in the administrator's signoff queue 32E. If no notification is to be provided to the user when the event report is dequeued, the routine 600 branches from block 624 to block 628 where the event report is stored in the administrator's headless queue 32D.

From block 626 and 628, the routine 600 continues to block 650. At block 650, a local machine key is stored in the registry 28 identifying the queues that may be reported from. As known to those skilled in the art, a local machine key comprises a key that is available to any user of the client computer 2. As with the current user key described above with reference to block 644, the local machine key identifies each of the queues 32A–32E that contain untransmitted event reports.

From block 650, the routine 600 continues to block 652, where a local machine run key is set in the registry 28 for executing the queue reporting trigger program 26. As known to those skilled in the art, a local machine run key will cause the identified program to execute each time any user logs onto the client computer 2. In this manner, the queue reporting trigger program 26 may be executed each time a user logs into the client computer 2 following provision of the local machine run key.

From block 652, the routine 600 continues to block 654, where a SENS subscription for launching the reporting trigger 26 when the client computer 2 becomes connected to a network is enabled. As described above, enabling the SENS subscription in this manner causes the queue reporting trigger 26 to be executed when the client computer 2 becomes connected to a LAN 4 or the Internet 8. From block 654, the routine 600 continues to block 655, where it returns to block 418, described above with reference to FIG. 4.

Figure 7:
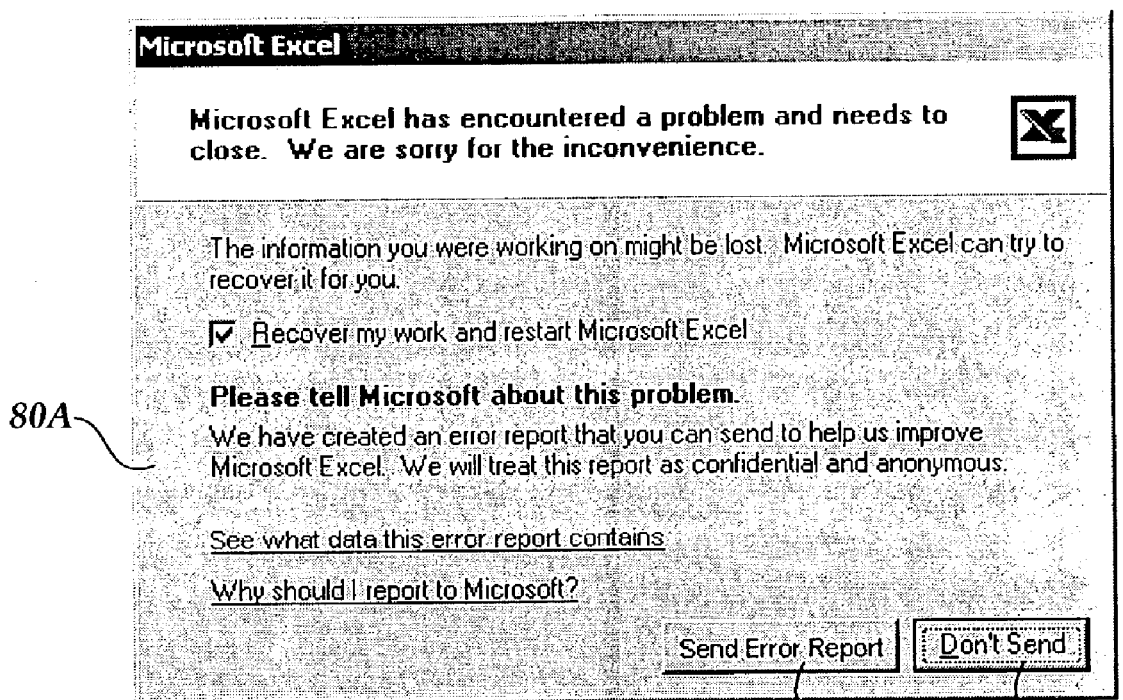
FIGS. 7–8 are screen diagrams showing illustrative user interface dialog boxes that may be presented to a user when an error occurs in various embodiments of the invention.
Figure 8:
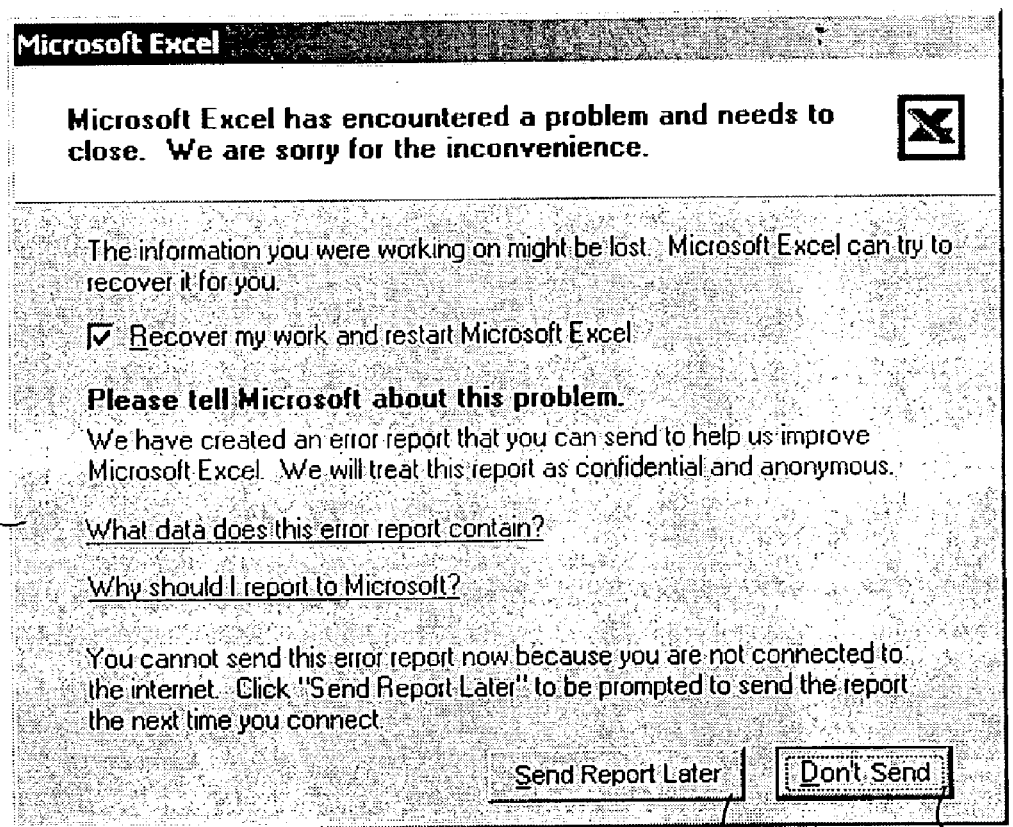

Referring now to FIGS. 7 and 8, an illustrative user interface will be described for notifying a user that an error has occurred on the client computer 2 and providing the user with the ability to transmit an event report regarding the error. As shown in FIG. 7, user interface dialog box 80A may be presented to the user indicating that an application program has encountered an error. As shown in FIG. 7, the user interface button 82B may be provided to the user allowing the user to prevent an event report regarding the error from being transmitted. A user interface button 82A may also be provided allowing the user to immediately transmit the event report. It should be appreciated that the user interface dialog box 80A shown in FIG. 7 is presented to a user when the client computer 2 is connected to either the LAN 4 or the Internet 8. If the client computer 2 is connected in this manner, the event report may be transmitted immediately and there is no need to queue the event reports.

If, however, the client computer 2 is offline when a reportable event occurs, the user interface dialog box shown in FIG. 8 will be displayed. The user interface dialog box 80B indicates to a user of the client computer 2 that an error has occurred. It also indicates to the user that the report may not be transmitted immediately because the client computer 2 is not connected to a network. Accordingly, a user interface button 82C is provided that allows the user to queue the event report for later transmission. A user interface button 82D is also provided that allows a user to select that the event report not be transmitted.

It should be appreciated that the user interface dialog boxes shown in FIGS. 7 and 8 are merely illustrative and that other types of user interfaces may be provided. In particular, other types of user interfaces may be provided that are customized to the type of event occurring. It should also be appreciated that, depending on the type of event occurring, no user interface may be provided to the user at the time an event report is generated. For instance, if a program assert is encountered in a line of executing code, it may be unnecessary to provide a user interface to the user when an event report concerning the assert is generated. A user interface may or may not be provided to the user when the event report for the assert is dequeued.

Figure 9:
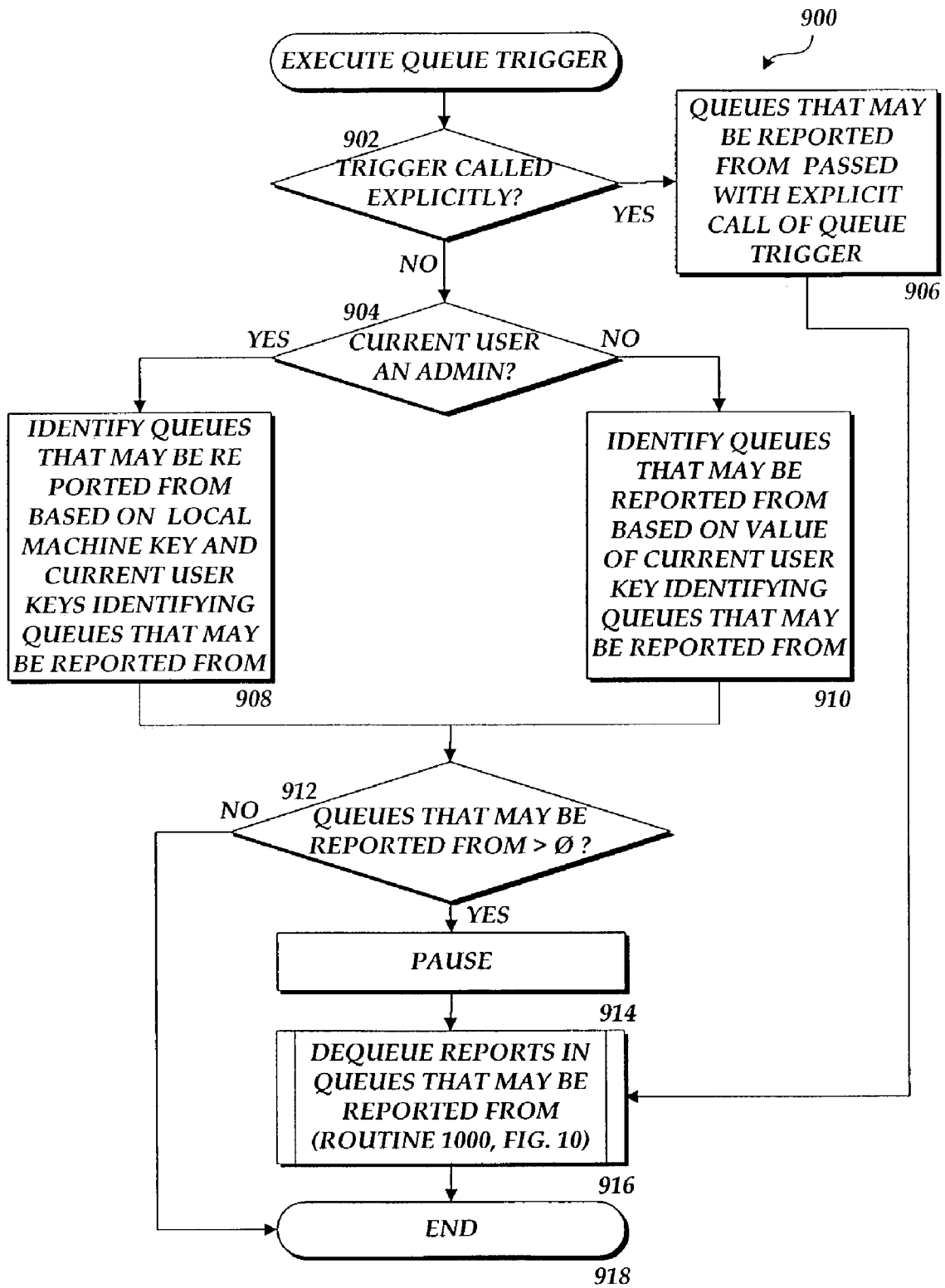
FIG. 9 is a flow diagram illustrating the execution of a queue trigger program that causes event reports to be dequeued in various embodiments of the invention.

Referring now to FIG. 9, an illustrative routine 900 will be described illustrating the execution of the queue reporting trigger program 26. As discussed above, following the queueing of an event report the queue reporting trigger 26 will be executed each time the user logs into the client computer 2 having a run key for executing the reporting trigger 26 and when the client computer 2 connects to a network. Alternatively, the queue reporting trigger 26 may be called from another application program directly. In this manner, programs that want to cause event reports to be immediately dequeued, may call the queue reporting trigger program 26. For instance, error reports generated on a small device such as a personal digital assistant may be synchronized to the client computer 2. In order to ensure that the event reports generated by the small device are immediately reported, a program responsible for synchronizing the small device may directly call the queue reporting trigger program 26.

The routine 900 begins at block 902, where a determination is made as to whether the queue reporting trigger program 26 was called explicitly. If the queue reporting trigger program 26 was called explicitly, the routine 900 branches to block 906 where the queues 32A–32E that may be reported from are identified based on a parameter passed with the explicit call of the queue reporting trigger 26. The routine 900 then continues from block 906 to block 916 where reports are dequeued that are contained in the queues that may be reported from. An illustrative routine 1000 illustrating a process for dequeueing reports is described below with reference FIG. 10. From block 916, the routine 900 continues to block 918, where it ends.

If, at block 902, it is determined that the queue reporting trigger 26 was not called explicitly, the routine 900 continues to block 904. At block 904, a determination is made as to whether current user of the client computer 2 is an administrator. If the current user is not an administrator, the routine 900 branches to block 910, where the queues that may be reported from are identified based on the value of the current user key identifying queues that may be reported from stored in the registry 28. As discussed above, each time an event report is queued, this key is updated to reflect the queues 32A–32E that contain event reports.

If, at block 904, it is determined that the current user of the client computer 2 is an administrator, the routine 900 branches to block 908. At block 908, the queues that may be reported from are determined based on both the local machine key and current user keys identifying queues that may be reported from. In this manner, the queues that may be reported from will include both user queues 32A–32C and administrator queues 32D–32E. From both blocks 908 and 910, the routine 900 continues to block 912.

At block 912, a determination is made as to whether the number of queues that may be reported from is greater than zero. If the number of queues that may be reported from is not greater than zero, the routine 900 branches from 912 to block 918, where it ends. If, however, the number of queues that may be reported from is greater than zero, the routine 900 continues from block 912 to block 914. At block 914, execution of the queue reporting trigger 26 is paused for a predetermined period of time to allow the client computer 2 to fully complete its startup process. Once this predetermined period of time has expired, the routine 900 continues from block 914, to block 916 where reports are dequeued. An illustrative routine 1000 is described below with respect to FIG. 10A–10C for dequeueing reports. The routine 900 then continues from block 916 to block 918, where it ends.

Figure 10A:
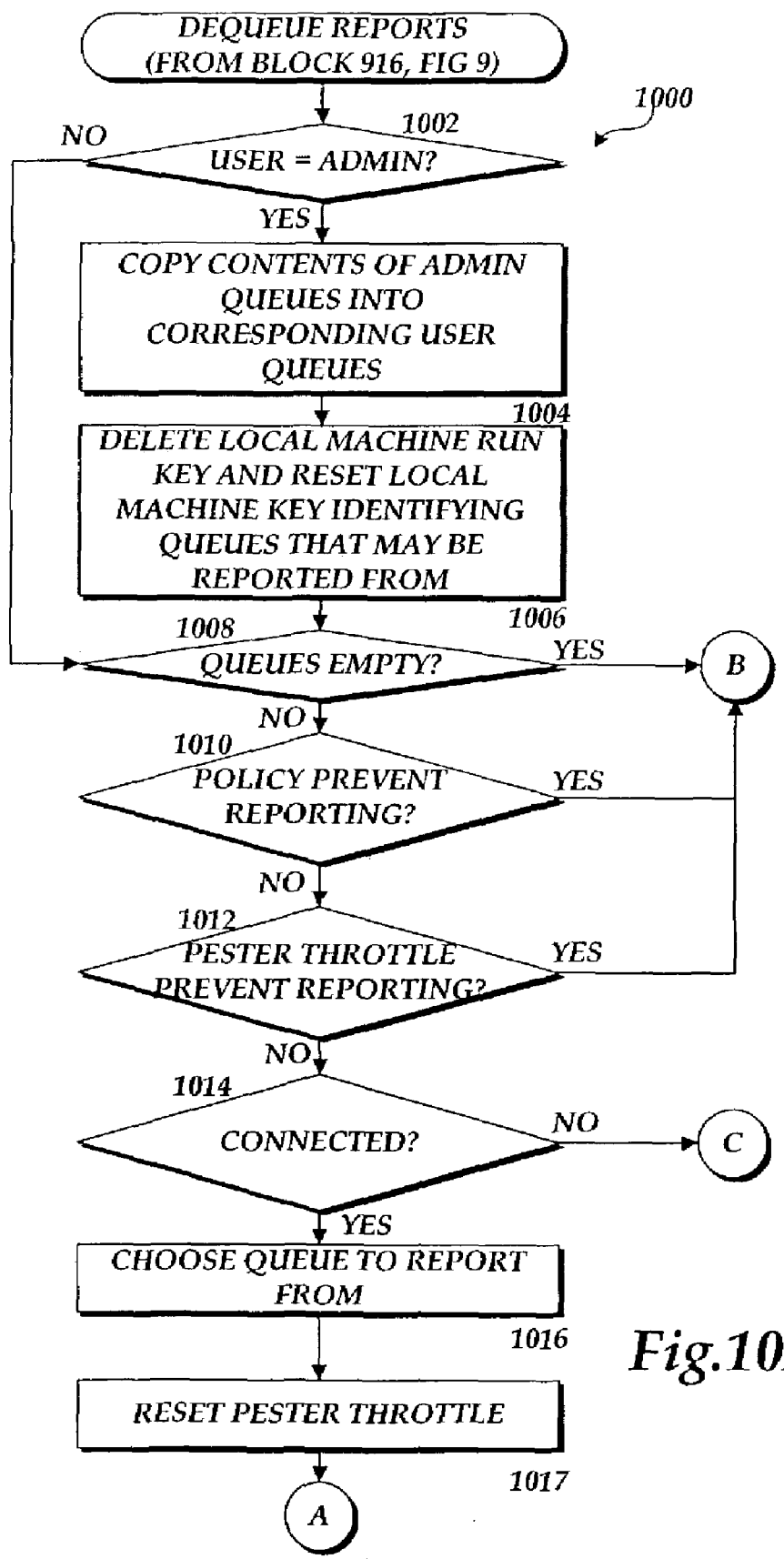
FIGS. 10A–10C are flow diagrams showing an illustrative routine for dequeueing reports according to various embodiments of the invention.
Figure 10B:
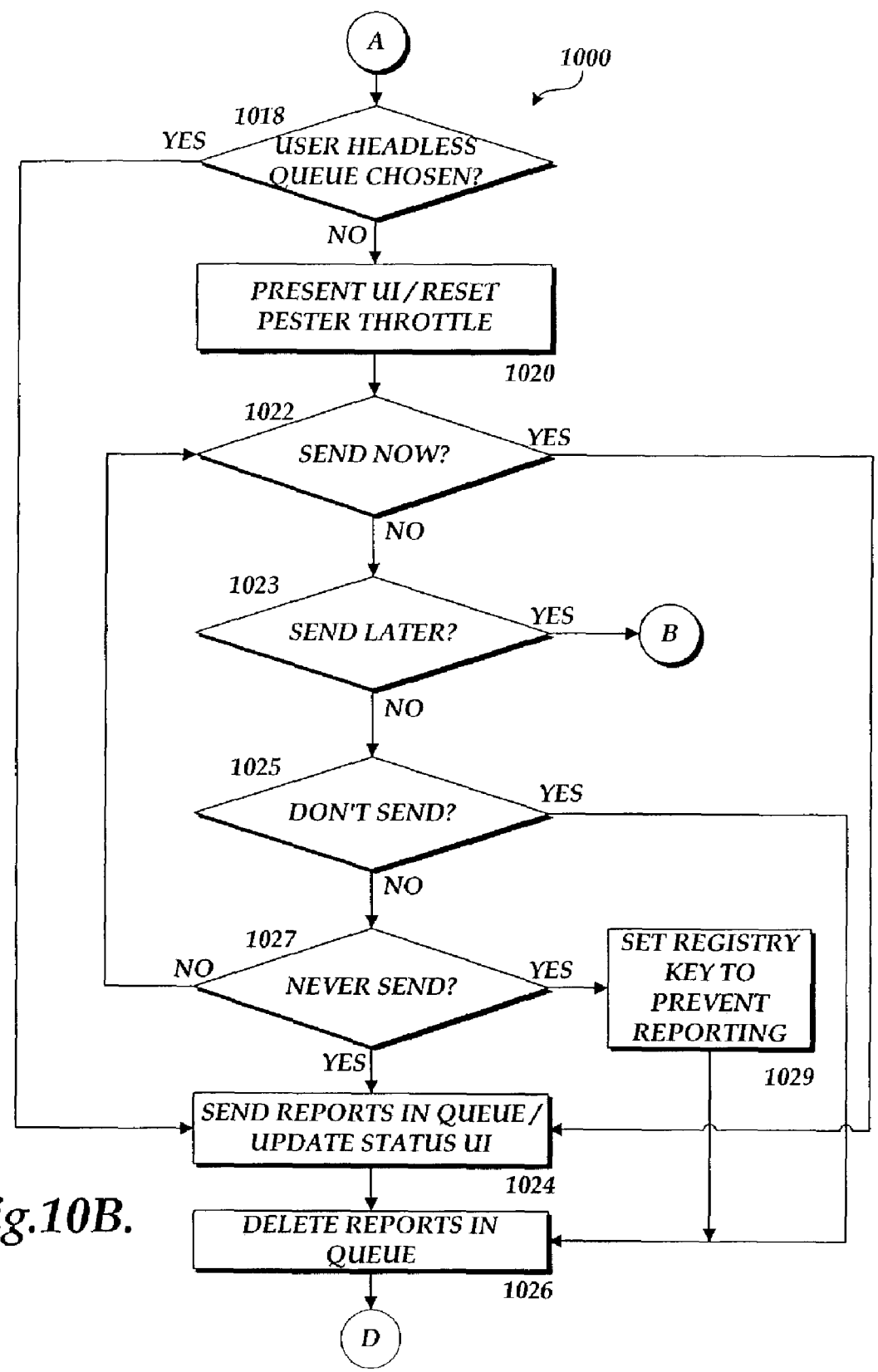
Figure 10C:
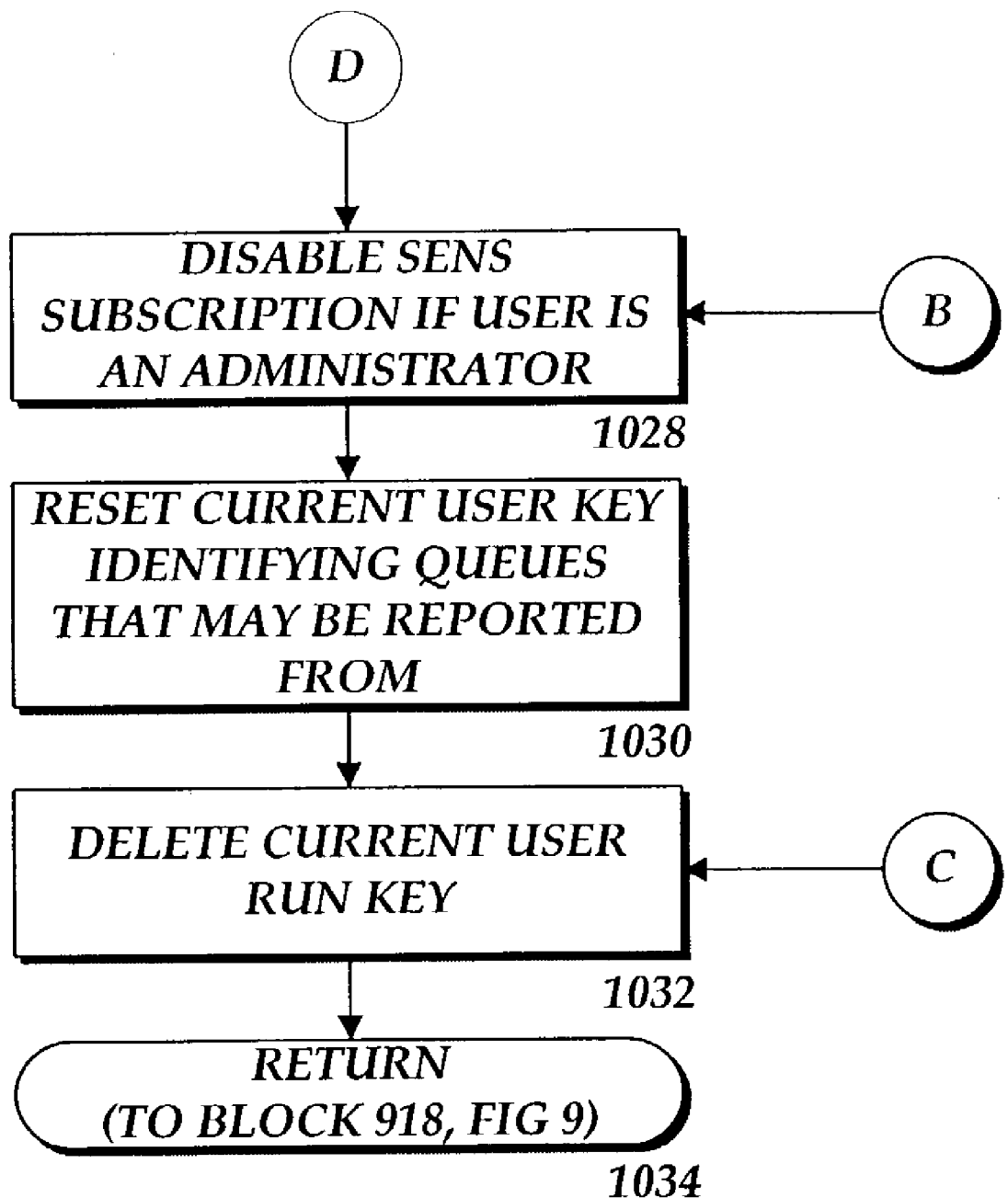

Referring now to FIGS. 10A–10C, an illustrative routine 1000 will be described for dequeueing reports. The routine 1000 begins at block 1002 where a determination is made as to whether the current user of the client computer 2 is an administrator. If the user is not an administrator, the routine 1000 branches from block 1002 to block 1008. If, however, the current user is an administrator, the routine 1000 continues from block 1002 to block 1004. At block 1004, the contents of the administrator headless queue 32D is copied to the user headless queue 32C. Additionally, the contents of the administrator signoff queue 32E are copied to the user signoff queue 32B. In this manner, the contents of the administrator queues 32D and 32E are copied to the corresponding user queue.

From block 1004, the routine 1000 continues to block 1006, where the local machine run key for executing the key reporting trigger 26 is deleted. Additionally, the local machine key that identifies the queues that may be reported from is also reset to zero. In this manner, the queue reporting trigger 26 will not be executed in response to a local machine run key.

From block 1006, the routine 1000 continues to block 1008, where a determination is made as to whether the queues 32A–32C are empty. If the queues 32A–32C are empty, the routine 1000 branches from block 1008 to block 1028. If, however, the queues 32A–32E are not empty, the routine 1000 continues to block 1010.

At block 1010, a determination is made as to whether a policy prevents transmission of the event report. As described above, a user or an administrator may indicate that event reports should not be transmitted. If the policy prevents reporting, the routine 1000 branches from block 1010 to block 1028. If policy does not prevent the reporting of events, the routine 1000 continues from 1010 to block 1012.

At block 1012, a determination is made as to whether the pester throttle prevents reporting of the event. As discussed above, the pester throttle is set and reset in a manner so as to minimize the number of user interface notifications provided to the user of the client computer 2 regarding event reports. If the pester throttle prevents reporting, the routine 1000 branches from block 1012 to block 1028. If, however, the pester throttle does not prevent reporting, the routine 1000 continues from block 1012 to block 1014.

At block 1014, a determination is made as to whether the client computer 2 is connected to a network. If the client computer 2 is not connected to a network, the routine 1000 branches from block 1014 to block 1032. If, however, the client computer 2 is connected to a network, the routine 1000 continues to block 1016.

At block 1016, one of the queues 32A–32C is chosen as a queue to report from. According to one embodiment of the invention, one of the queues 32A–32C is chosen at random to report from. However, it should be appreciated, that other methods may be utilized to choose one of the queues 32A–32C to report from. From block 1016, the routine 1000 continues to block 1017. At block 1017, the pester throttle is reset so that additional user interface notifications will not be provided to the user until a predetermined period of time has elapsed.

From block 1017, the routine 1000 continues to block 1018, where a determination is made as to whether the user headless queue 32C was chosen as the queue to report from. If the user headless queue 32C was chosen as the queue to report from, the routine 1000 branches to block 1024. If, however, a queue other than the user headless queue is chosen, the routine 1000 continues to block 1020. At block 1020, a user interface dialog box is presented to the user requesting authorization to transmit the event reports. An illustrative user interface shown to the user upon dequeueing is illustrated below with reference to FIGS. 11A–11B. From block 1020, the routine 1000 continues to block 1022.

At block 1022, a determination is made as to whether the event report should be transmitted immediately. If the event report should be transmitted immediately, the routine 1000 branches from block 1022 to block 1024. If, however, the event report should not be transmitted immediately, the routine 1000 continues from block 1022 to block 1023.

At block 1023, a determination is made as to whether the event report should be transmitted at a later time. If the event reports are to be transmitted at a later time, the routine 1000 branches from block 1023 to block 1028. If the event reports are not to be transmitted at a later time, the routine 1000 continues from block 1023 to block 1025.

At block 1025, a determination is made as to whether the event report should not be transmitted. If the event report should not be transmitted, the routine 1000 branches from block 1025 to block 1024. Otherwise, the routine 1000 continues from block 1025 to block 1027 where a determination is made as to whether the reports should never be transmitted. If the reports should never be transmitted, the routine 1000 continues to block 1024. Otherwise, the routine 1000 branches back to block 1022, described above.

At block 1024, the event reports contained in the selected queue to be reported from are either transmitted to either the CER file server 6 or the error reporting server computer 10. Additionally, a status indicator may be provided as part of the user interface dialog box. During transmission, the user interface is updated to provide a progress indicator to the user and to allow the user to access data contained in the event reports.

From block 1024, the routine 1000 continues to block 1026. At block 1026, the dequeued reports in the queue being reported from are deleted. The routine 1000 then continues from block 1026 to block 1028, where the SENS subscription is disabled if the current client computer 2 is an administrator. In this manner, the SENS subscription will not be instantiated each time a user logs into the client computer 2.

From block 1028, the routine 1000 continues to block 1030, where the current user key contained in the registry 28 identifying the queues that may be reported from is reset to reflect the dequeueing of reports in the queue that has been reported from. The routine 1000 then continues to block 1032, where the current user run key stored in the registry 28 that causes the queue reporting trigger 26 to execute is deleted. In this manner, the queue reporting trigger 26 will not be executed each time a user logs into the client computer 2. From block 1032, the routine 1000 continues to block 1034, where it returns to block 918 described above with referenced to FIG. 9.

Figure 11A:
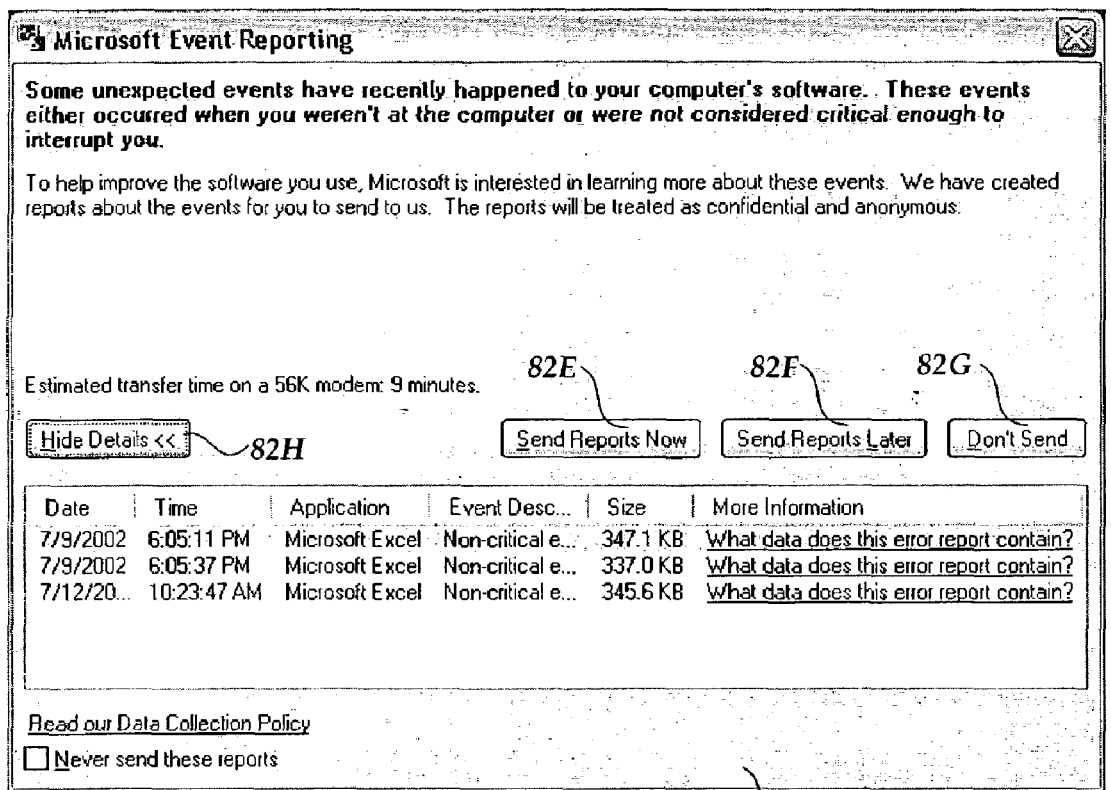
FIGS. 11A–11B are screen diagrams showing illustrative user interface dialog boxes that may be presented to a user when event reports may be dequeued in one embodiment of the invention.
Figure 11B:
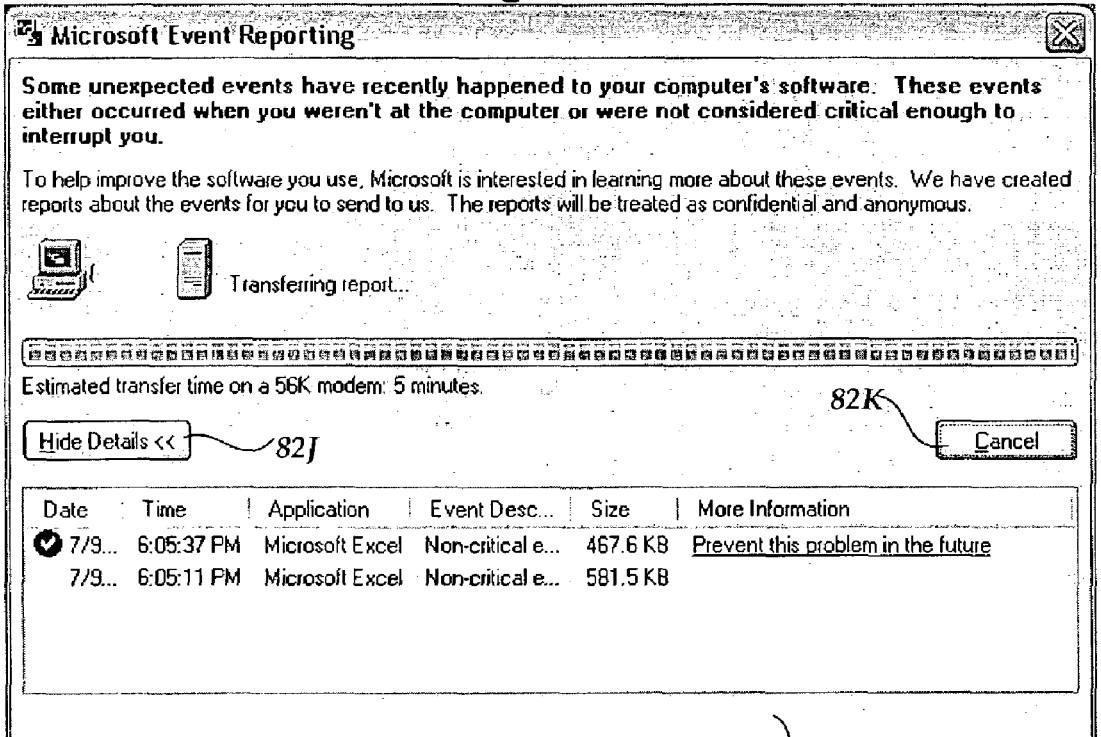

Referring now to FIGS. 11A and 11B, an illustrative user interface will be described as presented to a user of the client computer 2 when event reports are to be dequeued. As shown in FIG. 1A, a user interface dialog box 80C may be presented to user of the client computer 2 prior to dequeueing event reports. A user interface button 82G may be provided that allows the user to indicate that the event report should not be sent. A user interface button 82F may also be provided that allows the user of the client computer 2 to indicate that the reports should remain in the queue and an attempt be made at a later time to send the reports. Additionally, a user interface button 82E may be provided that allows the user to indicate that the event reports be transmitted immediately. A show/hide details button 82H may also be provided that allows a user to view a list of the event reports to be transmitted and to select one of the event reports and view its contents.

As shown in FIG. 11B, if the user elects to send the event reports, transmission of the event reports from the client computer 2 to either the CER file server 6 or the error reporting server computer 10 will occur. The user interface dialog 80D is updated to indicate the event reports that have been transmitted and to provide additional information regarding how the errors identified by the event reports may be prevented in the future. It should be appreciated that the user interface dialog boxes 80C and 80D are merely illustrative and that other types of information may be presented to user when dequeueing event reports.

Based on the foregoing, it should be appreciated that embodiments of the present invention provide a method, apparatus, and a computer-readable medium for queued mode reporting of events. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for reporting the occurrence of an event within a computer, the method comprising:
   determining whether the event has occurred;
   generating an event report describing the event in response to the occurrence of the event;
   determining whether the event can be immediately reported;
   queuing the event report in response to determining that the event cannot be immediately reported;
   reporting the event in response to determining that the event can immediately be reported; and
   providing one or more queues for temporary storage of the event report, wherein queuing the event report comprises storing the event report in a selected one of the one or more queues and wherein a one of the one or more queues comprises a user regular queue for temporarily storing the event report when a user of the computer is to be notified when the event occurs and when the event is reported.

2. The method of claim 1, wherein determining whether the event can be immediately reported comprises determining whether an active connection to a distributed computing network is currently available to the computer.

3. The method of claim 1, wherein determining whether the event can be currently reported comprises determining whether a connection may be established with a corporate error reporting file server.

4. The method of claim 1, wherein a one of the one or more queues comprises a user signoff queue for temporarily storing the event report when a user of the computer is not be to notified when the event occurs and is to be notified when the event is reported.

5. The method of claim 4, wherein a one of the one or more queues comprises a user headless queue for temporarily storing the event report when a user of the computer is not be notified when the event occurs and is not to be notified when the event is reported.

6. The method of claim 5, wherein a one of the one or more queues comprises an administrator signoff queue for temporarily storing the event report when a user of the computer is not to be notified when the event occurs and when an administrator user of the computer is to be notified when the event is reported.

7. The method of claim 6, wherein a one of the one or more queues comprises an administrator headless queue for temporarily storing the event report when an administrator user of the computer is not to be notified when the event occurs and when the administrator user is not be notified when the event is reported.

8. The method of claim 7, further comprising:
   in response to queuing the event report, providing a queue trigger program on the computer operative to execute in response to an active connection to a distributed computing network becoming available to the computer.

9. The method of claim 8, wherein the queue trigger program is further operative to execute in response to a user logging into the computer.

10. The method of claim 9, wherein the queue trigger program is further operative to execute in response to an explicit instruction to execute the queue trigger program.

11. The method of claim 9, wherein executing the queue trigger program comprises:
    identifying the one or more queues that contain error reports;
    determining whether one or more of the queues contain error reports; and
    in response to determining that one or more of the queues contain error reports, dequeueing the error reports contained in a one of the one or more queues.

12. The method of claim 11, wherein dequeueing the error reports contained in a one or more of the queues comprises:
    selecting a one of the one or more queues as a queue to be reported from;
    transmitting the event reports contained in the queue to be reported from to an error reporting server computer; and
    disabling further execution of the reporting trigger application.

13. The method of claim 12, wherein dequeueing the error reports further comprises:
    determining whether the queue to be reported from comprises either the user signoff queue or the user regular queue; and
    requesting approval from a user prior to transmitting the event reports in response to determining that the queue to be reported from comprises the user signoff queue or the user regular queue.

14. A computer-controlled apparatus capable of performing the method of claim 1.

15. A computer-readable medium comprising computer-executable instructions which, when executed by a computer, cause the computer to perform the method of claim 1.

16. A method for reporting the occurrence of an event within a computer, the method comprising:
    generating an event report describing the event;
    storing the event report in a selected one of a plurality of queues, the selected queue identified based upon whether a user of the computer is to be notified when the event occurs;
    causing a determination to be made when a user logs into the computer and when an active connection to a computing network becomes available to the computer as to whether the event report may be dequeued; and
    in response to determining that the error report may be dequeued, transmitting the event report to corporate error reporting file server or an error reporting server computer.

17. The method of claim 16, wherein the selected queue may further be identified based upon whether a user of the computer is to be notified when the event report is dequeued.

18. The method of claim 17, further comprising:
    in response to determining that the event report may be dequeued, selecting a one of the plurality of queues as a queue to report from and determining based on the queue to report from whether a notification should be provided prior to dequeueing a report stored in the queue to report from.

19. The method of claim 18, further comprising displaying the notification prior to dequeueing the report in response to determining that the notification should be provided.

20. A computer-readable medium comprising computer-executable instructions which, when executed by a computer, cause the computer to perform the method of claim 16.

21. A computer-controlled apparatus capable of performing the method of claim 16.

* * * * *